United States Patent [19]
Spears et al.

[11] Patent Number: 6,043,953
[45] Date of Patent: Mar. 28, 2000

[54] GEAR TRAIN CAPSTAN DRIVE ASSEMBLY FOR A TAPE DRIVE

[75] Inventors: Jesse Spears, Newport Beach; Ashok Nayak, Glendora; Michael Bolt, Costa Mesa, all of Calif.

[73] Assignee: Seagate Technology, Inc., Scotts Valley, Calif.

[21] Appl. No.: 08/880,056

[22] Filed: Jun. 20, 1997

Related U.S. Application Data

[63] Continuation of application No. 08/623,982, Mar. 28, 1996, abandoned, which is a continuation of application No. 08/257,737, Jun. 9, 1994, abandoned.

[51] Int. Cl.⁷ .................................................. G11B 15/26
[52] U.S. Cl. ................................................... 360/96.1
[58] Field of Search ............................ 360/96.1, 96.3, 360/96.4; 242/352, 352.3, 352.4, 340, 356.5, 338.4, 332.4

[56] References Cited

U.S. PATENT DOCUMENTS

| | | | |
|---|---|---|---|
| 3,620,429 | 11/1971 | Kozu ............................................. | 226/11 |
| 3,645,538 | 2/1972 | Zimmerman ............................... | 360/106 |
| 4,571,459 | 2/1986 | Yata ........................................... | 360/105 |
| 4,660,109 | 4/1987 | Aldenhoven ............................. | 360/96.1 |
| 4,698,706 | 10/1987 | Kilstofte .................................. | 360/96.4 |
| 4,816,952 | 3/1989 | Clausen .................................... | 360/128 |
| 5,236,146 | 8/1993 | Rudi et al. ................................ | 242/340 |
| 5,277,352 | 1/1994 | Ohkubo et al. ........................... | 226/188 |
| 5,315,462 | 5/1994 | Ohkubo et al. .......................... | 360/96.5 |
| 5,372,321 | 12/1994 | Ohkubo et al. ......................... | 242/352.4 |

FOREIGN PATENT DOCUMENTS

| | | | |
|---|---|---|---|
| 0 488 760 A2 | 11/1991 | European Pat. Off. . | |
| 60-164942 | 8/1985 | Japan ..................................... | 360/96.1 |
| 63-183650 | 7/1988 | Japan ..................................... | 360/96.1 |
| 0329181 | 8/1989 | Japan ..................................... | 360/96.1 |
| 1-294256 | 11/1989 | Japan ..................................... | 360/96.1 |
| WO 92/22058 | 12/1992 | WIPO . | |

*Primary Examiner*—Brian E. Miller
*Attorney, Agent, or Firm*—Fliesler Dubb Meyer & Lovejoy LLP

[57] ABSTRACT

A tape drive having a novel capstan motor assembly for advancing and rewinding a data tape. The capstan motor assembly according to the present invention includes a motor, a gear assembly and an idler. The gear assembly has a driver gear and a driven gear for transmitting motor torque from the motor to the idler. A portion of the idler is in contact with a capstan belt wheel within the cartridge. The idler rotates the capstan belt wheel, which in turn moves the data tape past the recording area. The gear train allows the motor force to be transmitted to the capstan belt wheel without slippage between the drive roller and the idler normally occurring in conventional capstan motor assemblies.

1 Claim, 9 Drawing Sheets

GEAR TRAIN CAPSTAN DRIVE ASSEMBLY FOR A TAPE DRIVE

This application is a continuation of Ser. No. 08/623,982 filed Mar. 28, 1996, now abandoned, which is a continuation of Ser. No. 08/257,737, filed Jun. 9, 1994, now abandoned.

BACKGROUND OF THE INVENTION

1. Field of the Invention

The present invention relates to a tape drive capstan motor assembly for moving a tape within a tape cartridge, and more particularly to a capstan motor assembly including an intermeshing gear train for transmitting motor torque from the motor to the tape driver without slippage between the elements.

2. Description of the Related Art

Tape drives are widely used in data processing systems for applications including primary data storage, archival data storage, journaling, and most significantly, as a back-up data storage device to the system's hard drive. Conventional tape drives are designed to transfer data to and from a length of magnetically encoded tape, typically one-quarter inch in width, which tape is transferred between a supply reel and a take-up reel. Currently, most 3½ inch form factor tape drives utilize a so called "minicartridge" cassette tape for data storage. This type of cartridge is generally described in American National Standard ANSI 3.55-1977.

Figure 1:
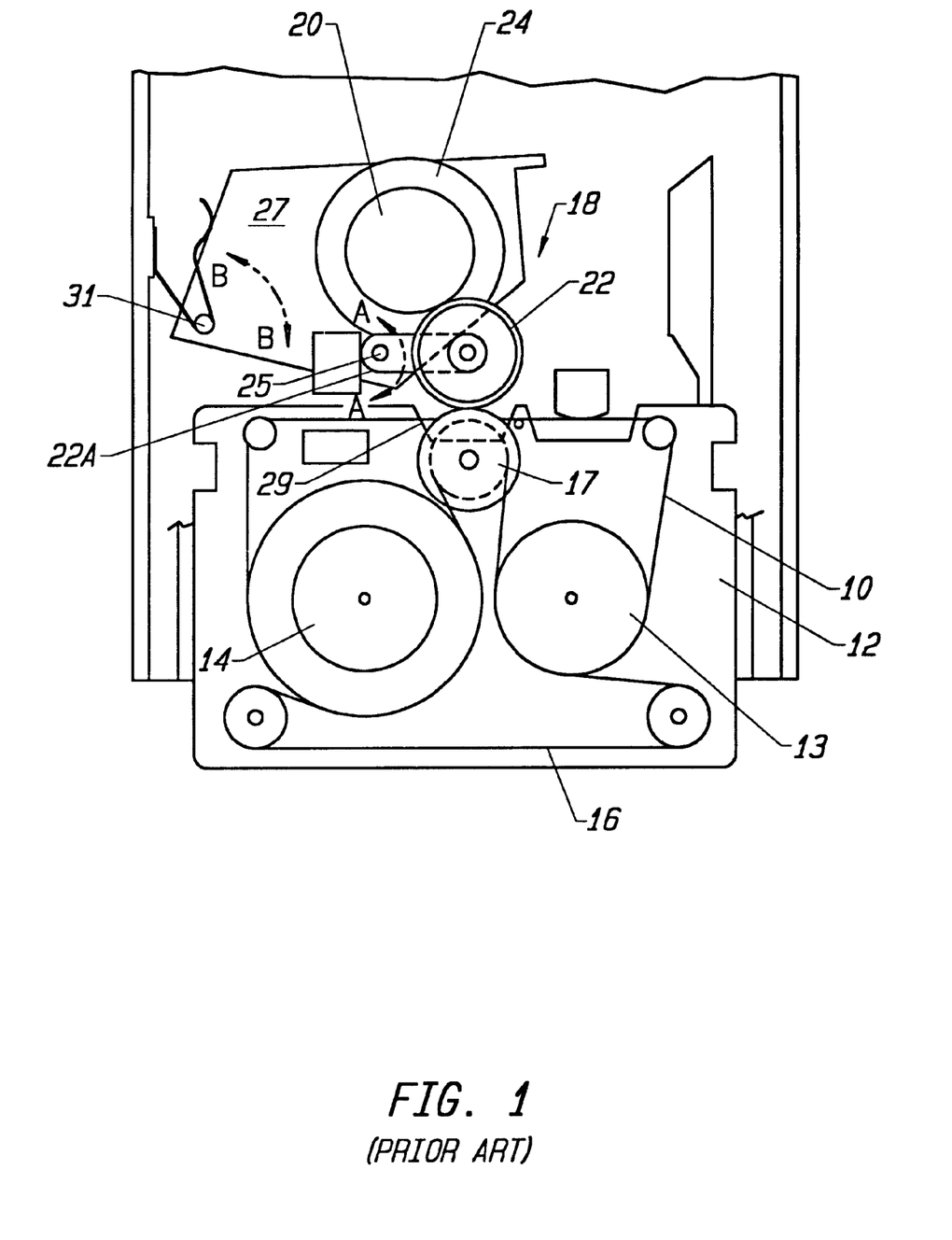
FIG. 1 is a top view of a conventional capstan motor assembly.

In conventional tape drive operation, as shown in FIG. 1, the data tape 10 within the cartridge 12 travels from a supply reel 13, past a front face of the cartridge, and is stored on a take-up reel 14. The tape is advanced between the take-up and supply reels by means of a belt 16 within the cartridge. The belt is wrapped around a capstan belt wheel 17 within the cassette which is driven by a capstan motor assembly 18 within the tape drive.

As shown in FIG. 1, a conventional capstan motor assembly 18 includes a capstan drive roller 20 rotatably engaging an idler 22. Idler 22 is small enough so that a portion of the idler may be received through the opening 29 in the front face of cartridge 12 to thereby contact the capstan belt wheel 17 within the cartridge 12. When the cartridge 12 is properly inserted within the drive, the capstan belt wheel pushes against the idler 22, which in turn pushes against the drive roller 20, thus creating a pressure contact between the capstan belt wheel 17 and idler 22, and between idler 22 and drive roller 20. A motor 24 causes rotation of the capstan drive roller 20. The roller 20 rotates idler 22, which in turn rotates wheel 17 so as to advance the tape 10.

In conventional capstan motor assemblies, the idler 22 may be supported on one end of a swinging link 22A so as to pivot about a pivot point 25 in a direction indicated by arrow A—A. The capstan motor 24, drive roller 20, and pivot point 25 may further be supported on a plate 27, which is also provided to pivot about a pivot point 31 in the direction of arrow B—B. Allowing the plate 27 and link 22A to pivot provides a substantially equal contact pressure between the drive wheel 20 and the idler 22, and between idler 22 and the capstan belt wheel 17.

Conventionally, at least the outer circular surface of idler 22 is covered with an elastic material having a high coefficient of friction. This material is provided to prevent slippage between the idler and the drive roller, and between the idler and the capstan belt wheel as those elements rotate in contact with each other. However, a problem with conventional capstan motor assemblies is that, over time, the circular surfaces of the capstan drive roller, the idler and/or the capstan belt wheel may become worn, and particulate matter may lodge between the elements, thereby deforming the circular shape of the elements. Moreover, dirt may accumulate on the elements, thereby decreasing the frictional force between adjacent contacting surfaces. All of these occurrences tend to cause slippage between the drive roller and idler, and between the idler and the capstan belt wheel. Slippage inhibits drive performance for several reasons. Significantly, it is very important to both monitor and control the speed with which the data tape advances past the recording area. When slippage occurs, there is no way to accurately control and maintain the speed of the advancing tape. Moreover, particularly during a recording cycle, the rotational speed of the capstan motor is often used to monitor the translational speed of the data tape. However, when slippage occurs, the motor speed will not accurately reflect the speed of the data tape. A loss of the ability to control and/or monitor the tape speed may result in read/write errors or even drive failure in extreme cases.

SUMMARY OF THE INVENTION

It is therefore an object of the present invention to provide a tape drive wherein the speed of the advancing data tape may be accurately controlled and monitored over prolonged use of the drive.

It is a further object of the present invention to provide a tape drive including a capstan motor assembly for preventing slippage between the capstan drive roller and the driven idler.

These and other objects are accomplished with the present invention which relates to a tape drive having a novel capstan motor assembly for advancing and rewinding a data tape. The capstan motor assembly according to the present invention includes a capstan motor, a motor extension fixedly mounted on top of the capstan motor, and a driver gear fixedly mounted on top of the motor extension. The capstan motor assembly may further include an idler mounted adjacent and in non-contacting relation to the motor extension. A driven gear is mounted on top of the idler. When a tape cartridge is properly loaded within the tape drive, the driver gear matingly engages the driven gear. Thus, upon rotation of the capstan motor, the driver gear rotates the driven gear, which in turn causes rotation of the idler. A portion of the idler is in contact with a capstan belt wheel within the cartridge. The idler rotates the capstan belt wheel, which in turn moves the data tape past the recording area. The gear train allows the motor force to be transmitted to the capstan belt wheel without slippage between the drive roller and the idler normally occurring in conventional capstan motor assemblies.

BRIEF DESCRIPTION OF THE DRAWINGS

The invention will now be explained with reference to the Figures in which.

DESCRIPTION OF BEST MODE OF THE INVENTION

The invention will now be described with reference to FIGS. 1–8, which relate in general to a tape drive 40 for transferring data to and from a data tape 42 within a cartridge 44. The tape drive includes a novel design for the capstan motor assembly, which, in a preferred embodiment of the present invention, may be utilized within a 3½ inch form factor tape drive. However, it is understood that the present invention may be utilized in tape drives of various sizes and designs and may operate with any data tape recording technique, including longitudinal, helical and arcuate scan recording. In a preferred embodiment, the present invention operates with a conventional industry standard minicartridge data tape cartridge 44. However, the present invention is not limited to operation with a minicartridge, and may operate with tape cartridges of various sizes and designs.

Figure 2A:
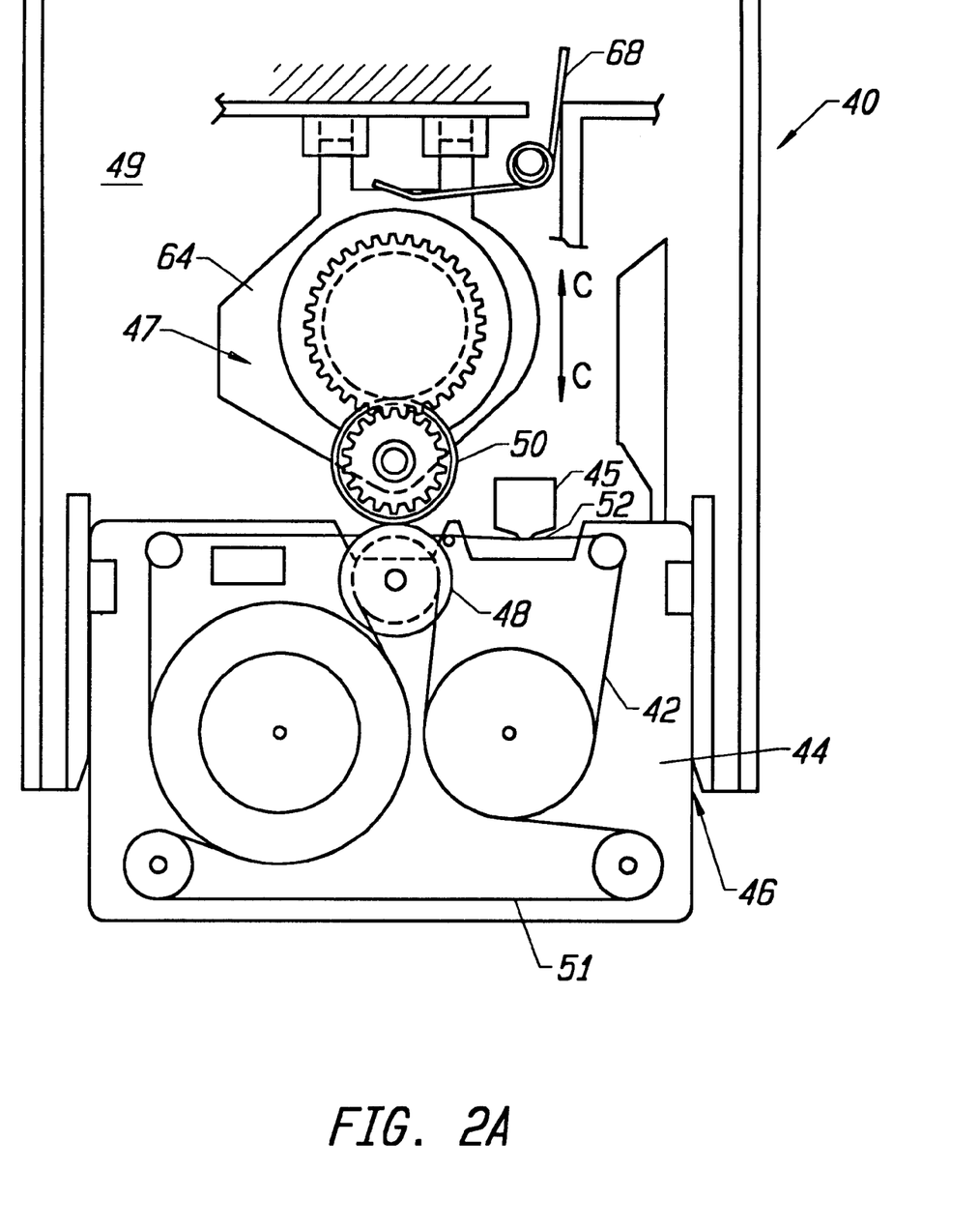
FIG. 2A is a top view of a tape drive according to the present invention.
Figure 2B:
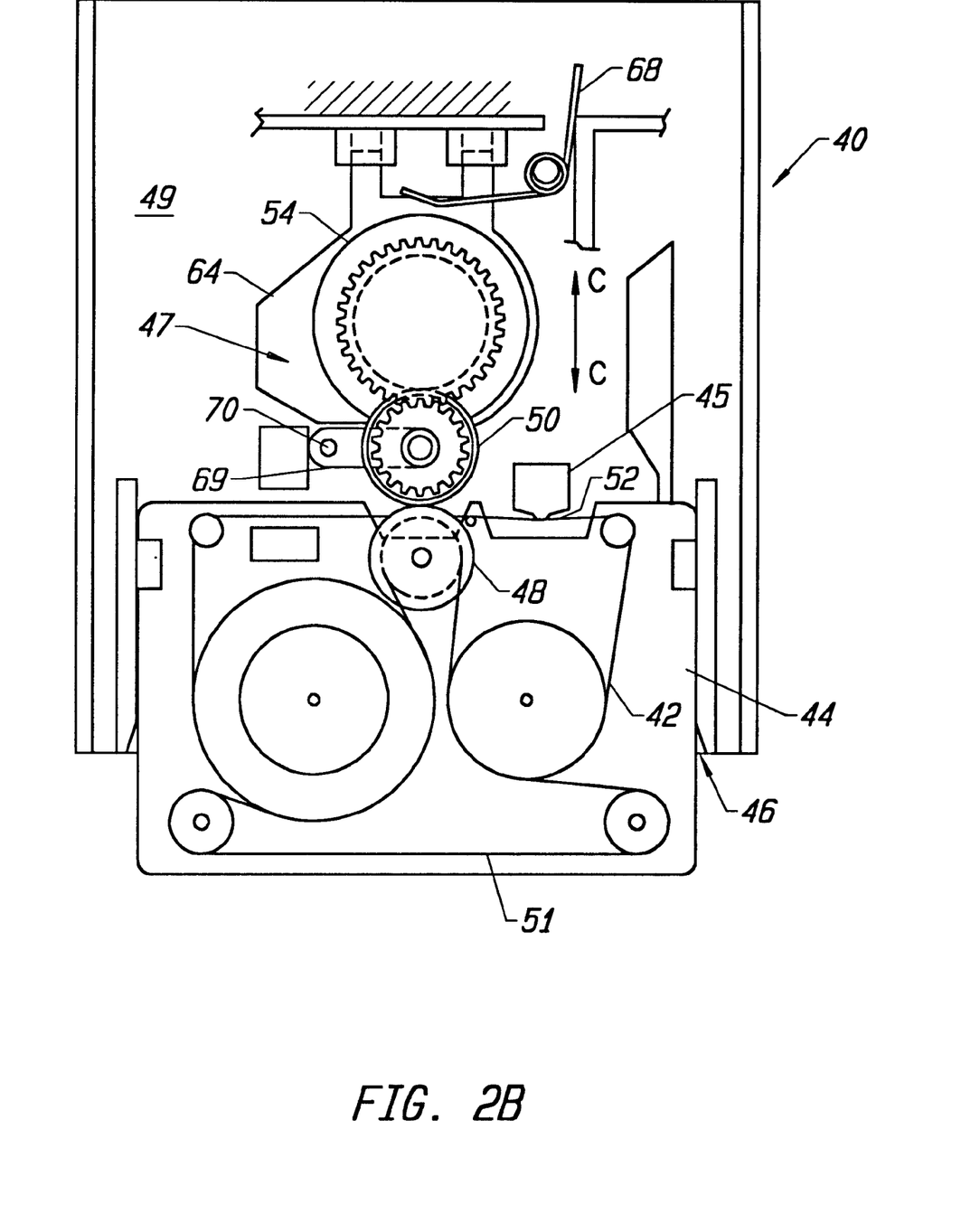
FIG. 2B is a top view of an alternative embodiment of the present invention.

Referring now to FIG. 2, there is shown a tape drive 40 according to the present invention. The cartridge 44 is inserted into the drive through a slot 46 formed in a front surface of the drive housing. The drive 40 includes a capstan motor assembly 47 for advancing and rewinding the data tape 42, and a read/write assembly 45 for transferring data to and from the data tape 42. Upon full insertion of the cartridge 44 into the drive as shown in FIG. 2, a capstan belt wheel 48 located within the cartridge is adjacent to and in contacting relation with an idler 50 of the capstan motor assembly 47. In the loaded position, a section of the tape 42 is exposed to and located adjacent a read/write transducer 52 of the read/write assembly 45. In response to power and control signals received from a printed circuit board (not shown), the capstan motor assembly 47 rotates the capstan belt wheel 48, which in turn advances the belt 51 to thereby advance or rewind the data tape 42. Data may be transferred to or from the tape 42 by the read/write assembly 45 as the tape passes a recording area in the proximity of the transducer 52.

Figure 3:
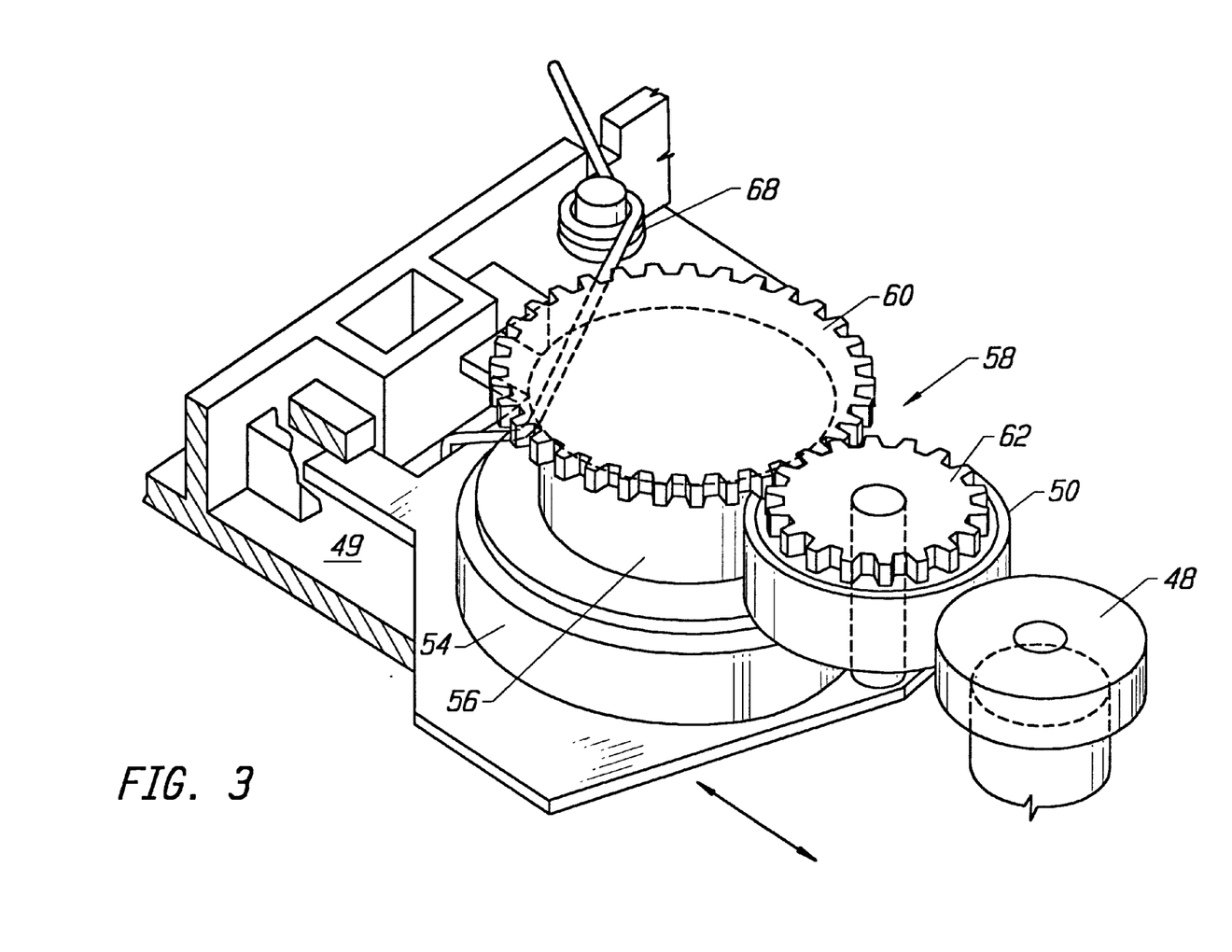
FIG. 3 is perspective view of the capstan motor assembly according to the present invention.
Figure 4:
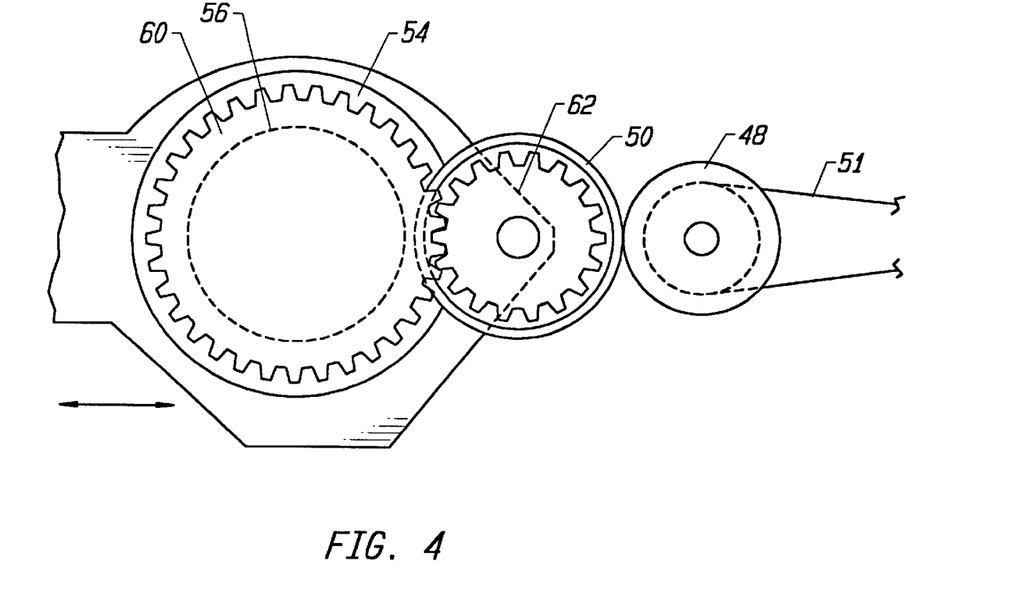
FIG. 4 is a top view of the capstan motor assembly according to the present invention.
Figure 5:
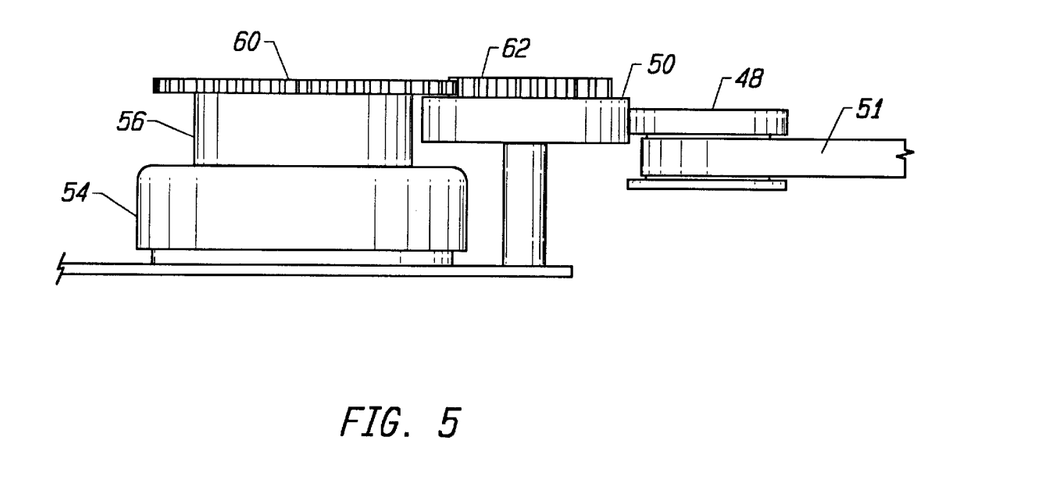
FIG. 5 is a side view of the capstan motor assembly according to the present invention.

A preferred embodiment of the capstan motor assembly according to the present invention will now be described with reference to FIGS. 3–5. In addition to idler 50, the capstan motor assembly may include a motor 54, a motor extension 56 located on top of the motor 54, and a gear train 58 comprised of a driver gear 60 mounted on top of the extension 56 and a driven gear 62 mounted on top of the idler 50.

Motor 54 may be any of various conventional DC brushless capstan drive motors, such as for example that manufactured by Matsushita-Kotobuki Electronics Industries Ltd., of Ehime, Japan, having an output torque of approximately 3.3 inch-ounces. This output force may be varied in alternative embodiments of the invention. Motor extension 56 may be attached to the rotating portion of motor 54 and is provided to locate the driver gear 60 in the same plane as the driven gear 62. The shape and diameter of extension 56 are not critical to the present invention and may be varied in alternative embodiments with the limitation that extension 56 be small enough so as not to contact or otherwise interfere with the operation of the idler 50, with which the extension 56 is preferably coplanar. The extension 56 may be formed integrally with the rotating outer surface of motor 54, or, alternatively, it may be affixed to the outer surface of the motor by screw means and/or adhesives. In an alternative embodiment, the motor extension 56 may be omitted from the present invention. In this embodiment, gear 60 may be mounted directly to the rotating portion of the motor 54, and provided with a height such that at least a portion of the gear 60 is coplanar with gear 62.

Gear train 58 may preferably be a conventional spur gear arrangement, where driver gear 60 receives power from motor 54 to drive the driven gear 62. In a preferred embodiment, the axis of rotation of the driver gear and motor is approximately 21.20 mm away from the axis of rotation of the driven gear and idler. Further, the radius of the driver gear measured from the axis of rotation to the pitch circle of the gear is 11 mm, and the similarly measured radius of the driven gear is 10 mm. In a preferred embodiment of the present invention, the motor 54 and gear 60 preferably rotate at 2000 rpm during normal read/write operations and at 3000 rpm during rewind of the data tape. Being 10% smaller, gear 62 rotates at 2200 rpm and 3300 rpm during read/write and rewind, respectively, and outputs a torque of approximately 3 inch-ounces. However, it is understood that in alternative embodiments of the invention, the distance between the axes of rotation of the gears 60 and 62 may be varied, and the ratio of the size of the driver gear to the driven gear may be varied to thereby alter the mechanical advantage of the gear train. Thus, for example, in an alternative embodiment of the present invention, the driven gear 62 may be larger than the driver gear 60. In such an embodiment, the driven gear 62 will have a lower angular velocity and a higher torque than the driver gear 60. Moreover, the gears 60 and 62 may be of the same size, whereby gear 62 has the same angular velocity and torque as gear 60 (but in the opposite direction).

With gears 60 and 62 having the dimensions disclosed in the preferred embodiment above, gears 60 and 62 have 55 and 50 gear teeth, respectively. These numbers may vary in embodiments where the gears have different diameters. As is known in the art, the contour of the teeth is provided so as to minimize wear, vibration and noise. Importantly, there are sufficient numbers of teeth on the gears 60 and 62 so that the gears rotate with a constant angular velocity. In a preferred embodiment, the gears 60 and 62 may both be formed from acetal plastic or santoprene rubber, which materials allow meshing of the gears with a minimum of acoustic noise, and have a high resistance to wear. Similar materials may be used in alternative embodiments. The gears 60 and 62 may be attached to the motor extension 56 and idler 50, respectively, by screw means and/or adhesives. Alternatively, the gears may molded directly onto the motor extension and idler.

As shown on FIGS. 2A–5, the capstan motor assembly 47 may be mounted on a plate 64, which is in turn mounted on the tape drive base plate 49, so that the plate 64 translates in a direction parallel to the direction of tape insertion into the drive as shown by arrow C—C. A spring 68 is provided to bias plate 64 in a direction opposite to the direction of tape insertion. It is understood that the plate may be biased by other known biasing systems in alternative embodiments of the present invention. In a preferred embodiment, the idler 50 and gear 62 may be fixedly mounted on the plate 64. Fixedly mounted, idler 50 and gear 62 translate with the plate 64, and a constant spacing is maintained between the axis of rotation of the idler 50 and gear 62, and the axis of rotation of the motor 54 and gear 60. As such, gears 60 and 62 remain in constant meshing engagement. Upon insertion of the cartridge, the capstan belt wheel 48 engages the idler 50. Further insertion of the cartridge moves the plate 64, and the gear train 58 and motor 54 fixedly mounted thereon, rearward against the opposing force of the spring 68. The spring 68 maintains the idler 50 in a pressure contact with the capstan belt wheel 48 while the cartridge is inserted in the drive.

In an alternative embodiment shown in FIG. 2B, idler 50 may be mounted on a swing arm 69 which freely pivots around a pin 70, which pin is mounted to the base 49. Pivotal mounting of the idler on the base 49 allows the idler and gear 62 to move independently of the motor 54, extension 56 and gear 60, all mounted on the plate 64. Such an arrangement provides a substantially equal contact force between the gears 60 and 62 on one hand, and between the idler 50 and the capstan belt wheel 48 on the other. In this embodiment, upon partial insertion of the cartridge 44, the capstan belt wheel 48 within the cartridge engages the idler 50. Further insertion of the cartridge moves the idler 50 rearward to thereby move gear 62 into full meshing engagement with gear 60. The biasing force of spring 68 ensures that the meshing engagement of gears 60 and 62 is maintained, and ensures a pressure contact between idler 50 and capstan belt wheel 48 while the cartridge 44 is inserted within the drive 40.

It has been experimentally determined that significantly more slippage occurs between the drive roller and the idler as compared to between the idler and the capstan belt wheel in conventional capstan motor assemblies. Thus, by replacing the friction based operation of a conventional drive roller and idler with a gear train as described above, the ability of the assembly to avoid slippage is significantly improved.

Figure 6A:
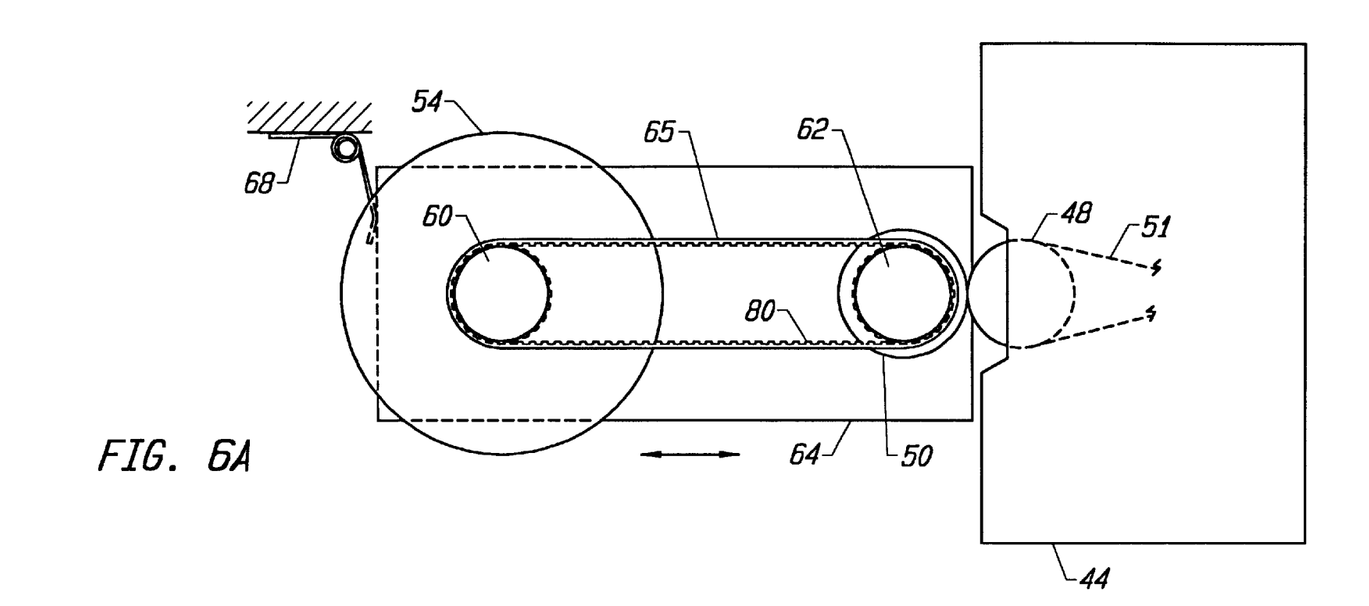
FIG. 6A is a top view of an alternative embodiment of the present invention.
Figure 6B:
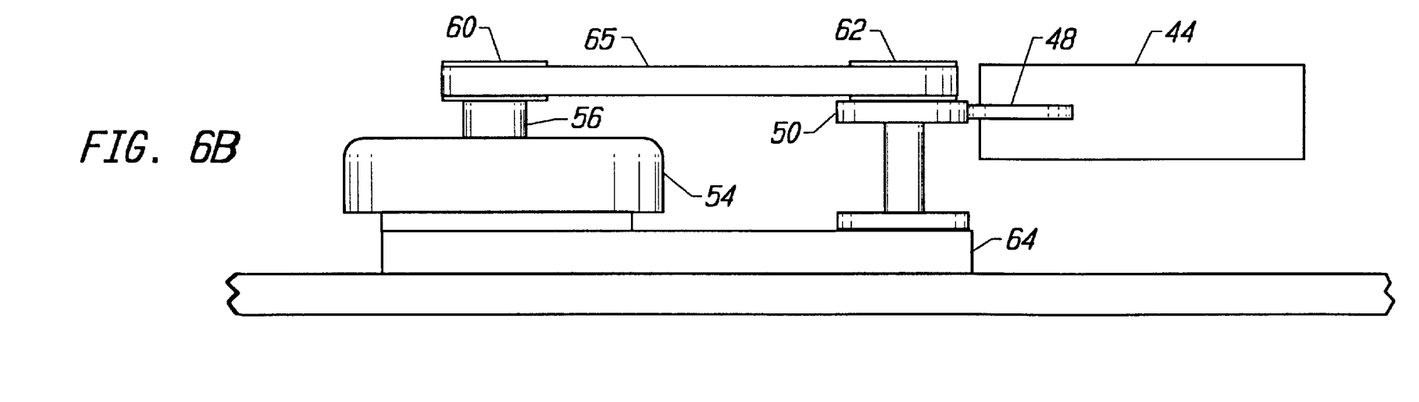
FIG. 6B is a side view of the alternative embodiment shown in FIG. 6A.

In an alternative embodiment of the present invention shown in FIGS. 6A and 6B, the capstan motor assembly 47 is structurally and operationally similar to that described with respect to FIGS. 2–5, with the exception that gear 60 is laterally spaced and does not mesh with gear 62. In this embodiment, the motor torque is transmitted from gear 60 to gear 62 by means of a timing belt 65 having a first end looped around gear 60 and a second end looped around gear 62. Timing belt 65 is formed with a plurality of notches 80 spaced from each other so as to mesh with the gear teeth on both gears 60 an 62. Thus, torque from the motor 54 may be transmitted to the idler 50 without slippage between the transmission members 60, 62 and 65. In an alternative embodiment, the belt may have a flat inner surface having a high coefficient of friction. In this embodiment, the gears 60 and 62 may be replaced by rollers having uniform circular outer diameters, and similarly preferably formed with high coefficients of friction.

In a preferred embodiment, the axis of rotation of the motor 54, motor extension 56 and gear 60 may be spaced approximately 21.36 mm away from the axis of rotation of the idler 50 and gear 62. However, this distance may vary in alternative embodiments.

In embodiments shown in FIGS. 6A–7C, the motor 54 and idler 50 may both be fixedly mounted on a plate 64 with respect to each other to maintain a constant spacing between the gears 60 and 62. Thus, a constant tension may be maintained within belt 65. Plate 64 is mounted within the tape drive to translate in a direction parallel to the direction of insertion of the cartridge 44. The plate 64 is biased by a spring 68 in a manner and direction described above to thereby maintain a pressure contact between idler 50 and capstan belt wheel 48 when cartridge 44 is fully inserted within the tape drive.

Figures 7A, 7C:
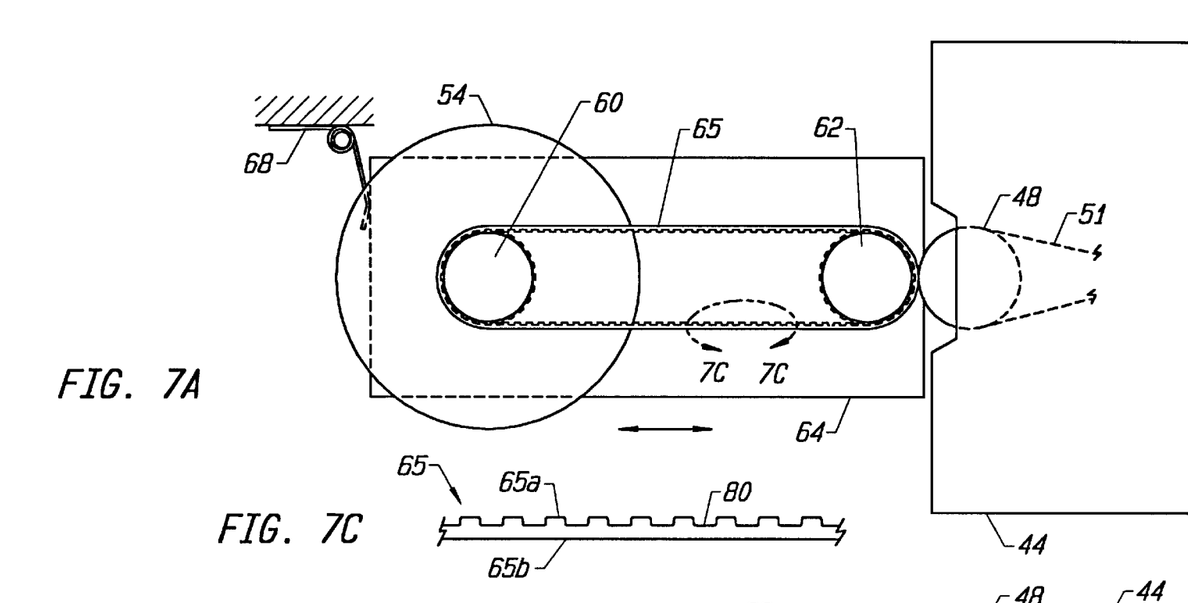
FIG. 7A is a top view of a further embodiment of the present invention.
FIG. 7C is an enlarged side view of a portion of the drive belt of the embodiment shown in FIGS. 7A and 7B.
Figure 7B:
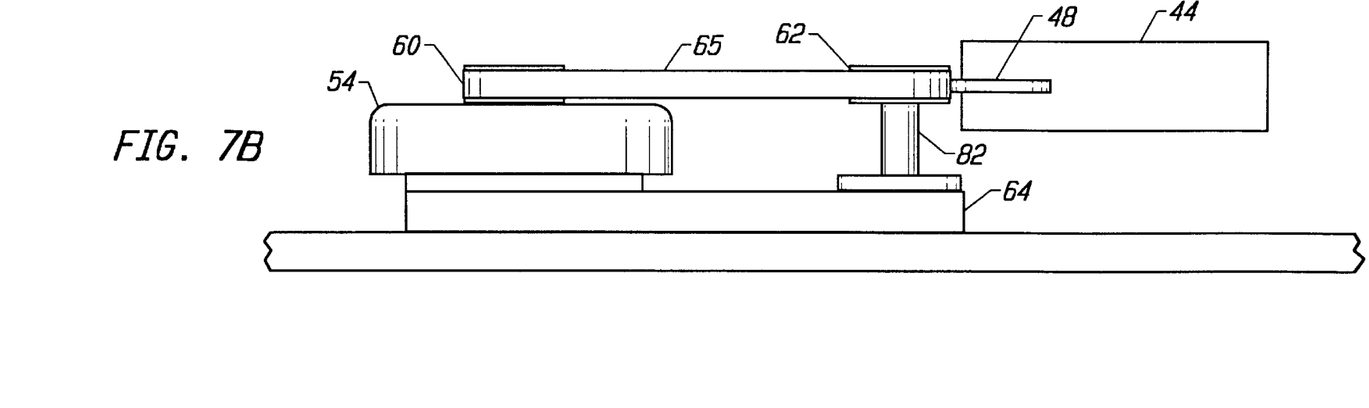
FIG. 7B is a side view of the alternative embodiment shown in FIG. 7A.

A further embodiment of the present invention is shown in FIGS. 7A–7C. This embodiment is similar to that shown in FIGS. 6A and 6B, with the exception that the capstan motor assembly 47 in this embodiment operates without the motor extension 56 and without the idler 50. In this embodiment, the gear 60 is mounted directly to the cover of motor 54, and gear 62 is rotationally mounted on a pin 82. Both the stator of motor 54 and the pin 82 are fixedly mounted on plate 64 with respect to each other such that the distance between gears 60 and 62 remains constant. Plate 64 is biased by a spring 68 in a manner and direction described above. Gears 60 and 62 are provided in substantially the same plane as the capstan belt wheel 48, which plane is substantially perpendicular to the axes of rotation of gear 60, gear 62 and belt wheel 48. As described above, the motor torque is transmitted from gear 60 to gear 62 by means of a timing belt 65 having a first end looped around gear 60 and a second end looped around gear 62. Timing belt 65 resides in substantially the same plane as gears 60 and 62 and belt wheel 48. As shown in FIG. 7C, belt 65 may have an inner surface 65a having notches 80 which mesh with gears 60 and 62 as the gears and belt rotate. However, as previously described, inner surface 65a may alternatively have a smooth surface with a high coefficient of friction. Belt 65 further includes an outer surface 65b similarly having a high coefficient of friction.

In operation, upon insertion of cartridge 44, capstan belt wheel 48 engages the outer surface 65b of the timing belt 65, which in turn biases the gear 62 and plate 64 rearward. This rearward movement is opposed by the biasing force of spring 68. As result, a pressure contact is established between the outer surface 65b and the capstan belt wheel 48. Due to the high coefficient of friction of outer surface 65b and the pressure contact between surface 65b and belt wheel 48, rotation of the timing belt 65 causes rotation of the belt wheel, to thereby advance or rewind the tape 42.

Providing a timing belt 65 as described above with respect to FIGS. 6A–7C allows increased flexibility with respect to the location of motor 54 and location of the tape drive components in general. Moreover, with respect to the embodiment shown in FIGS. 7A–7C, by redesigning the capstan motor assembly to operate without an idler, the overall height of the tape drive may be advantageously reduced. The overall height of the tape drive in FIGS. 7A–7C in a preferred embodiment may be approximately 1.0 inches.

Figure 8:
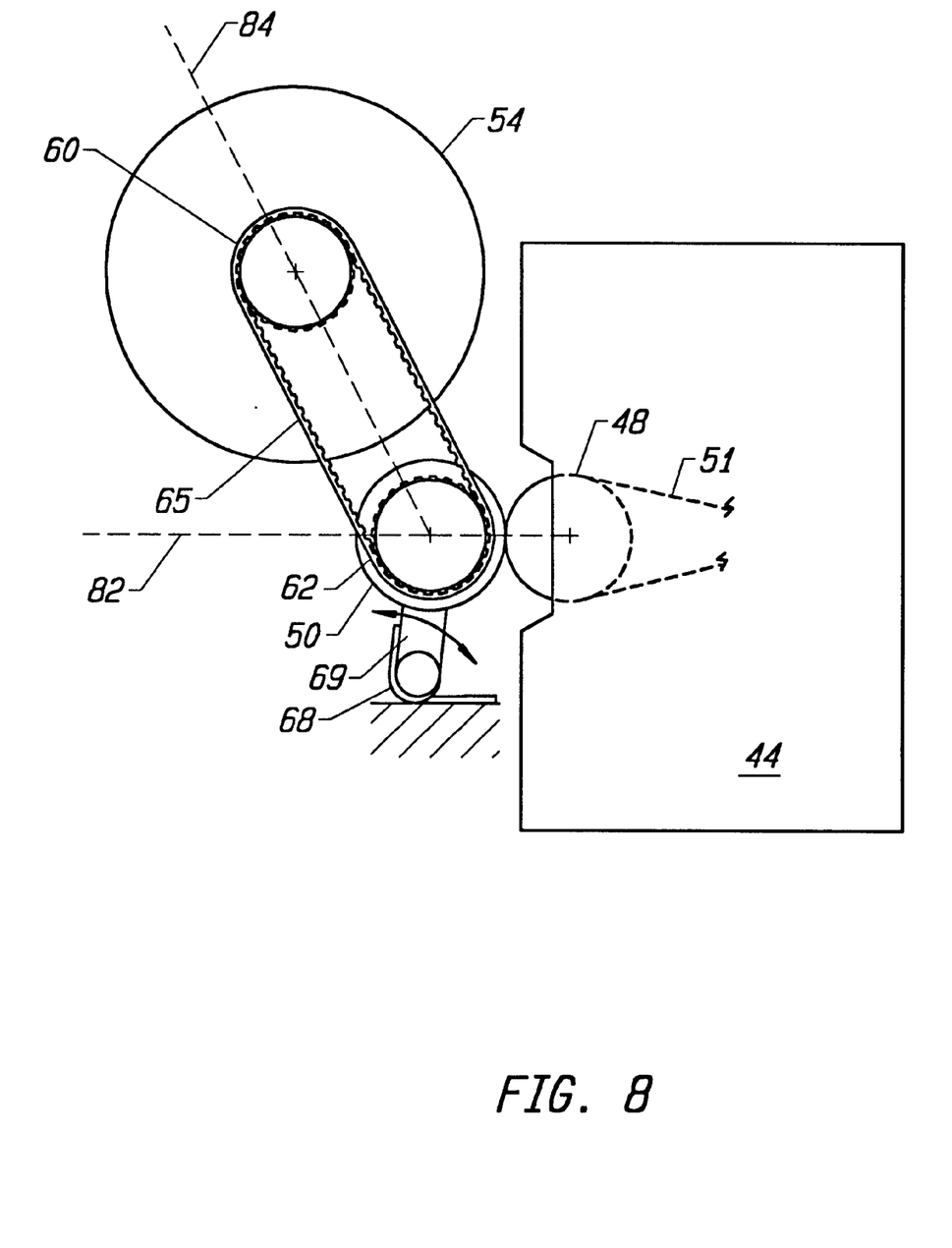
FIG. 8 is a top view of a further embodiment of the present invention.

In an alternative embodiment of the capstan motor assembly shown in FIG. 8, the idler 50 and/or gear 62 may be mounted on a swing arm 69 which is pivotally mounted to the tape drive base as described above with reference to FIGS. 2–5. In this embodiment, insertion of the cartridge will force the idler rearward, but the motor 54 and driver gear 60 remain stationary. A relatively constant spacing must be maintained between the gears 60 and 62 so that belt 65 remains taut. Thus, in this embodiment motor 54 and gear 60 may be located within the drive such that a line 82 through the center of the capstan belt wheel and gear 62 is near to orthogonal to a line 84 through the center of gear 60 and gear 62. With this orientation, rearward movement of idler 50 upon cartridge insertion will minimally change the spacing between gears 60 and 62. In this embodiment, the swing arm 69 may be biased by a spring 68 as previously described to oppose the force exerted on the idler 50 and/or gear 62 by the belt 65, to thereby ensure a pressure contact between the idler 50 or belt 65 and the capstan belt wheel.

Figure 9:
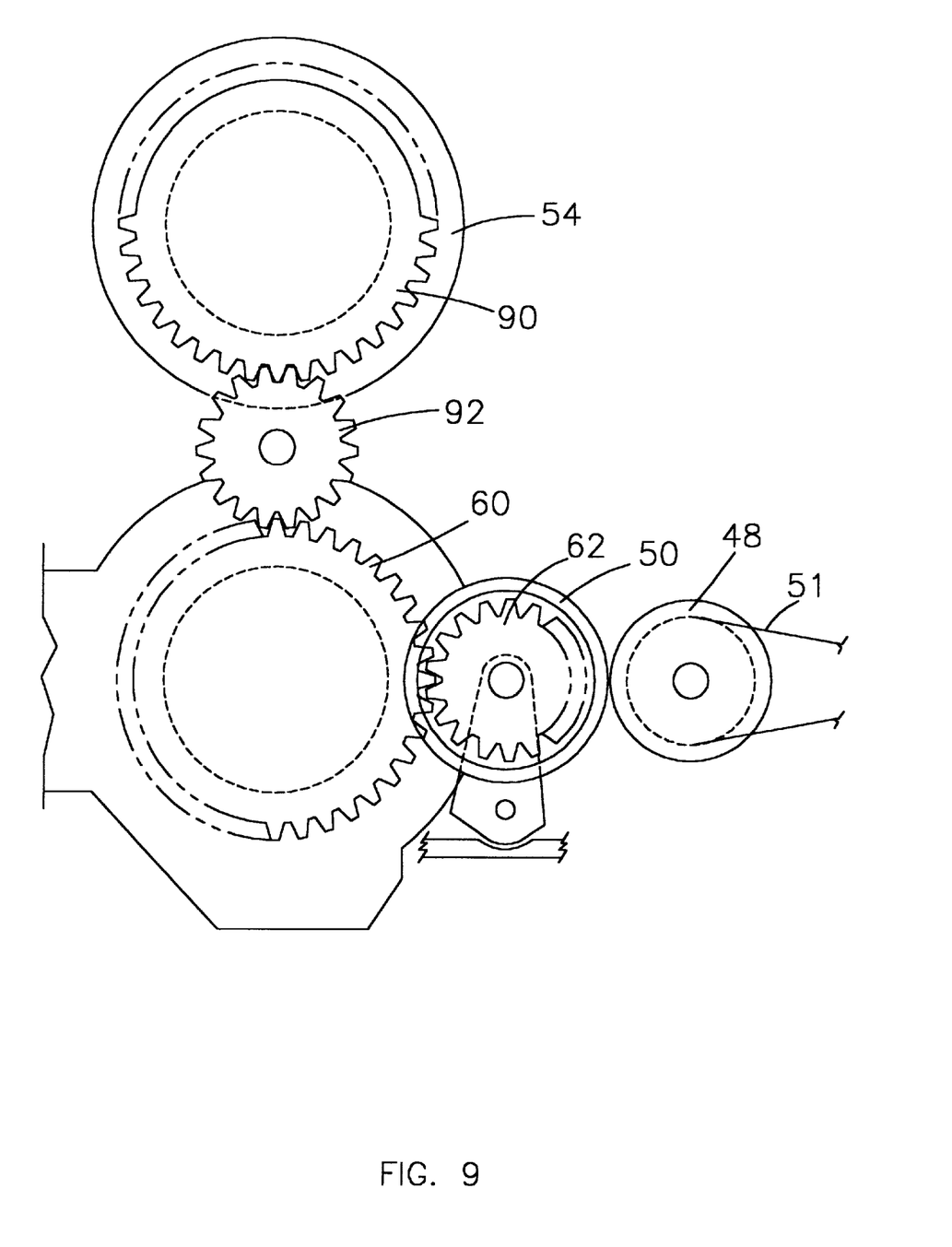
FIG. 9 is a top view of a further embodiment of the present invention.

In a further embodiment of the present invention, the motor 54 may not have the same axis of rotation as the driver gear 60. In this embodiment, a timing belt as described above may be used to transmit the motor force from the motor to the driver gear. Similarly, where the axes of rotation of the motor and driver gear are not coextensive, one or more additional gears (such as for example gears 90 and 92 shown on FIG. 9) may be added to the system to transmit the motor force from the motor to the gear 60.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A tape drive, comprising:

a housing including a slot in one surface for receiving a tape cartridge therein;

transducing means for transferring data to and from a data tape within said tape cartridge; and a capstan motor assembly for driving a tape advance mechanism within said tape cartridge, said capstan motor assembly including:

a plate translationally mounted to said housing, a motor mounted on said plate for supplying power, a first gear sharing a common axis of rotation with, and driven by, said motor, a second gear rotationally mounted on said plate, a belt having an inner surface and an outer surface, said inner surface including a plurality of teeth, said belt being looped around said first and second gears with said teeth of said inner surface meshing with said first and second gears, said first gear being capable of rotating said belt, said outer surface of said belt capable of physically engaging and driving the tape advance mechanism to move the tape, and biasing means affixed to said plate for biasing said belt into engagement with said tape advance mechanism.

* * * * *